US011841049B2

(12) United States Patent
Jaeger et al.

(10) Patent No.: US 11,841,049 B2
(45) Date of Patent: Dec. 12, 2023

(54) BEARING, ASSEMBLY, AND METHOD OF MAKING AND USING THE SAME (71) Applicant: SAINT-GOBAIN PERFORMANCE PLASTICS PAMPUS GMBH, Willich (DE)

(72) Inventors: Hans-Juergen Jaeger, Huerth (DE); Ali Oeztuerk, Willich (DE); Benjamin Kuemmel, Kerkrade (NL)

(73) Assignee: SAINT-GOBAIN PERFORMANCE PLASTICS PAMPUS GMBH, Willich (DE)

( * ) Notice: Subject to any disclaimer, the term of this patent is extended or adjusted under 35 U.S.C. 154(b) by 134 days.

(21) Appl. No.: 16/827,797

(22) Filed: Mar. 24, 2020

(65) Prior Publication Data

US 2020/0309192 A1 Oct. 1, 2020

Related U.S. Application Data

(60) Provisional application No. 62/823,791, filed on Mar. 26, 2019.

(51) Int. Cl.
*F16C 33/12* (2006.01)
*F16C 17/02* (2006.01)
*F16C 33/10* (2006.01)

(52) U.S. Cl.
CPC ............ *F16C 33/122* (2013.01); *F16C 17/02* (2013.01); *F16C 33/10* (2013.01)

(58) Field of Classification Search
CPC ...... B60L 15/2045; B60L 50/53; B60L 53/00; B60L 58/10; B60L 1/02; B60L 8/003; B60L 15/2018; B60L 7/18; B60L 7/10; B60L 15/2009; B60L 2240/423; B60L 2240/10; B60L 2260/24; B60L 2240/642; B60L 2200/28; B60L 2200/36; B60L 2240/80; B60L 2220/46; B60L 2220/44; B60L 50/16; B60L 15/32; B60L 58/20; B60L 58/12; B62D 59/04; B62D 63/08; B60K 1/04; B60K 17/356; B60K 1/00; B60K 2001/001; B60K 2001/0444; B60K 2001/0438; Y02T 10/64; Y02T 10/70; Y02T 10/72; Y02T 90/16; Y02T 90/14; Y02T 10/7072; B60Y 2400/304; B60Y 2400/61;
(Continued)

(56) References Cited

U.S. PATENT DOCUMENTS 5,672,435 A 9/1997 Born et al.
5,971,617 A 10/1999 Woelki et al.
(Continued)

FOREIGN PATENT DOCUMENTS

CN 1313911 A 9/2001
CN 1348532 A 5/2002
(Continued)

*Primary Examiner* — Taiwo Oladapo
(74) *Attorney, Agent, or Firm* — Abel Schillinger, LLP; Ann Palma (57) ABSTRACT

A bearing including a substrate layer including an aluminum alloy including a thickness, $T_S$, where $T_S \leq 0.6$ mm; an adhesive layer; and a low friction material layer overlying the adhesive layer, where the bearing includes an elongation at break, $A_{50}$, of $\geq 23\%$.

15 Claims, 5 Drawing Sheets

(58) Field of Classification Search
CPC .......... B60Y 2200/148; B60Y 2200/91; B60Y 2300/181; B60Y 2300/18125; B60Y 2300/182; B60Y 2300/52; B60Y 2300/60; B60Y 2400/216; B60Y 2400/301; F16C 33/122; F16C 17/02; F16C 33/10; F16C 11/04; F16C 11/045; F16C 17/10; F16C 33/046; F16C 33/206; F16C 2202/06; F16C 2204/20; F16C 2208/30; F16C 2208/32; F16C 2226/40; F16C 2240/60; F16C 2300/02; B32B 3/02; B32B 33/00; B32B 2255/06; B32B 2270/00; B32B 5/024; B32B 2307/714; B32B 1/08; B32B 15/082; B32B 15/085; B32B 2250/03; B32B 2250/05; B32B 2307/538; B32B 2307/54; B32B 2307/732; B32B 2307/746; B32B 2307/752; B32B 2475/00; B32B 2605/08; B32B 7/12; B32B 15/08; B32B 15/18; B32B 15/20; B32B 27/08; B32B 27/20; B32B 27/304; B32B 27/322; B32B 7/02; C22C 21/00; C09J 201/04

See application file for complete search history.

(56) References Cited

U.S. PATENT DOCUMENTS

| | | | |
|---|---|---|---|
| 6,979,129 B2 | 12/2005 | Farbaniec et al. | |
| 8,585,293 B2 | 11/2013 | Jager et al. | |
| 9,022,656 B2 | 5/2015 | Burgeff et al. | |
| 9,297,416 B2 | 3/2016 | Ziegler et al. | |
| 2004/0057780 A1* | 3/2004 | Farbaniec | F16C 13/006 403/34 |
| 2010/0080497 A1* | 4/2010 | Jaeger | F16C 33/201 384/276 |
| 2010/0098360 A1 | 4/2010 | Schmitjes et al. | |
| 2011/0049834 A1 | 3/2011 | Natu | |
| 2011/0150375 A1 | 6/2011 | Jaeger et al. | |

FOREIGN PATENT DOCUMENTS

| | | | | |
|---|---|---|---|---|
| CN | 103118869 A | 5/2013 | | |
| CN | 103270327 A | 8/2013 | | |
| CN | 105980722 A | 9/2016 | | |
| DE | 3601568 A1 | 7/1987 | | |
| EP | 0807189 B1 | 9/2000 | | |
| EP | 1582275 B1 | 5/2007 | | |
| JP | 2002155327 A | 5/2002 | | |
| JP | 2006044224 A | * | 2/2006 | ............... B05D 5/08 |
| JP | 2006044224 A | | 2/2006 | |
| JP | 2017527477 A | | 9/2017 | |

* cited by examiner

BEARING, ASSEMBLY, AND METHOD OF MAKING AND USING THE SAME

CROSS-REFERENCE TO RELATED APPLICATION(S)

This application claims priority under 35 U.S.C. § 119(e) to U.S. Provisional Application No. 62/823,791 entitled "BEARING, ASSEMBLY, AND METHOD OF MAKING AND USING THE SAME," by Hans-Juergen JAEGER et al., filed Mar. 26, 2019, which is assigned to the current assignee hereof and incorporated herein by reference in its entirety.

FIELD OF THE DISCLOSURE

This disclosure, in general, relates to bearings and their production and use in assemblies.

BACKGROUND

Bearings produced from composite materials consisting of a substrate layer and a low friction material layer overlay are generally known. The substrate layer and the low friction material layer are usually connected by laminating using a suitable adhesive. The composite materials can be used to form a bearing used, for example, by the automotive industry in door, hood, and engine compartment hinges, seats, steering columns, flywheels, balancer shaft bearings, or other vehicle components. Additionally, bearings formed from the composite materials can also be used in non-automotive applications. There is an ongoing need for improved bearings under varying conditions.

BRIEF DESCRIPTION OF THE DRAWINGS

The present disclosure may be better understood, and its numerous features and advantages made apparent to those skilled in the art by referencing the accompanying drawings.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing and bearing assembly arts.

Figure 1:
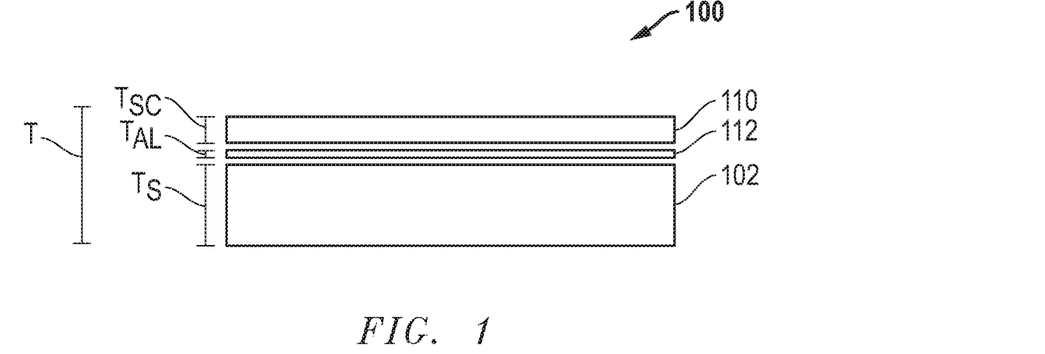
FIG. 1 is an illustration of the layer structure of a bearing according to a number of embodiments.

FIG. 1 shows a cross section illustrating the various layers of the bearing, generally designated 100. Bearing 100 can include a substrate layer 102. Bearing 100 can include a low friction material layer 110. Bearing 100 can include an adhesive layer 112.

The substrate layer 102 can be a metallic support layer. The metallic support layer can include a metal or metal alloy such as steel including carbon steel, spring steel, and the like, iron, aluminum, zinc, copper, magnesium, or any combination thereof. In a particular embodiment, the substrate layer 102 can be a metal (including metal alloys), such as aluminum. In a more particular embodiment, the substrate layer 102 can be aluminum 3003 alloy. In a number of embodiments, the substrate layer 103 may have a composition of: 96.8-99 wt % aluminum, 0.05 to 0.20 wt % copper, 0-0.70 wt % iron, 1 to 1.5 wt % manganese, 0-0.6 wt % silicon, and 0-0.1 wt % zinc. The substrate layer 102 can have a thickness, Ts, of between about 1 micron to about 1000 microns, such as between about 50 microns and about 500 microns, such as between about 100 microns and about 250 microns, such as between about 75 microns and about 150 microns. In a number of embodiments, the substrate layer 102 may have a thickness, Ts, of between about 100 microns and 500 microns. In a number of embodiments, the substrate layer 102 may have a thickness, Ts, of between about 350 microns and 450 microns. It will be further appreciated that the thickness, Ts, of the substrate layer 102 may be any value between any of the minimum and maximum values noted above. For example, thickness, Ts, of the substrate layer 102 may be 380 microns.

The low friction material layer 110 can be applied to the substrate layer 102. The low friction material layer 110 can include a polymer. In exemplary embodiments, the low friction material layer 110 can include a fluoropolymer. Examples of polymers that can be used in low friction material layer 110 include polytetrafluoroethylene (PTFE), fluorinated ethylene-propylene (FEP), polyvinylidenfluoride (PVDF), polychlorotrifluoroethylene (PCTFE), ethylene chlorotrifluoroethylene (ECTFE), perfluoroalkoxypolymer, polyacetal, polybutylene terephthalate, polyimide, polyetherimide, polyetheretherketone (PEEK), polyethylene, polysulfone, polyamide, polyphenylene oxide, polyphenylene sulfide (PPS), polyurethane, polyester, or any combination thereof. Additionally, low friction material layer 110 can include fillers, such as a friction reducing filler. Examples of fillers that can be used in the low friction material layer 110 include glass fibers, carbon fibers, silicon, graphite, PEEK, molybdenum disulfide, aromatic polyester, carbon particles, bronze, fluoropolymer, thermoplastic fillers, silicon carbide, aluminum oxide, polyamidimide (PAI), PPS, polyphenylene sulfone (PPSO2), liquid crystal polymers (LCP), aromatic polyesters (Econol), and mineral particles such as wollastonite and barium sulfate, or any combination thereof. Fillers can be in the form of beads, fibers, powder, mesh, or any combination thereof. The low friction material layer 110 can have a thickness, $Ts_L$, of between about 1 micron to about 500 microns, such as between about 10 microns and about 250 microns, such as between about 30 microns and about 150 microns, such as between about 40 microns and about 100 microns. In a number of embodiments, the low friction material layer 110 may have a thickness, $Ts_L$, of between about 50 microns and 330 microns. It will be further appreciated that the thickness, $Ts_L$, of the low friction material layer 110 may be any value between any of the minimum and maximum values noted above. For example, thickness, $Ts_L$, of the low friction material layer 110 may be 100 microns.

The low friction material layer 110 can be applied to the substrate layer 102 with the adhesive layer 112. The adhesive layer 112 may be disposed between the low friction material layer 110 and the substrate layer 102. In another alternate embodiment shown in FIG. 2, a woven mesh or expanded metal grid 120 may be embedded between two adhesive layers 112A and 112B. The adhesive layer 112 can be a hot melt adhesive. Examples of adhesive that can be used in adhesive layer 112 include fluoropolymers, an epoxy resins, a polyimide resins, a polyether/polyamide copolymers, ethylene vinyl acetates, Ethylene tetrafluoroethylene (ETFE), ETFE copolymer, perfluoroalkoxy (PFA), or any combination thereof. Additionally, the adhesive layer 112 can include at least one functional group selected from —C═O, —C—O—R, —COH, —COOH, —COOR, —CF$_2$═CF—OR, or any combination thereof, where R is a cyclic or linear organic group containing between 1 and 20 carbon atoms. In a particular embodiment, the adhesive layer 112 can be fluoropolymer glue. Additionally, the adhesive layer 112 can include a copolymer. In an embodiment, the hot melt adhesive can have a melting temperature of not greater than about 250° C., such as not greater than about 220° C. In another embodiment, the adhesive layer 112 may break down above about 200° C., such as above about 220° C. In further embodiments, the melting temperature of the hot melt adhesive can be higher than 250° C., even higher than 300° C. The adhesive layer 112 can have a thickness, $T_{AL}$, of between about 1 micron to about 100 microns, such as between about 10 microns and about 50 microns. For example, thickness, $T_{AL}$, of the adhesive layer 112 may be 27.5 microns.

Figure 2A:
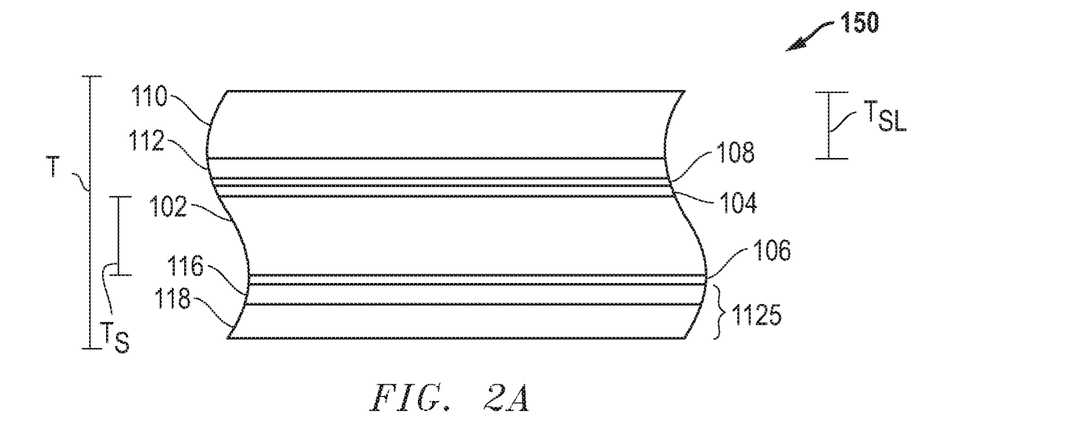
FIG. 2A is an illustration of the layer structure of a bearing according to a number of embodiments.
Figure 2B:
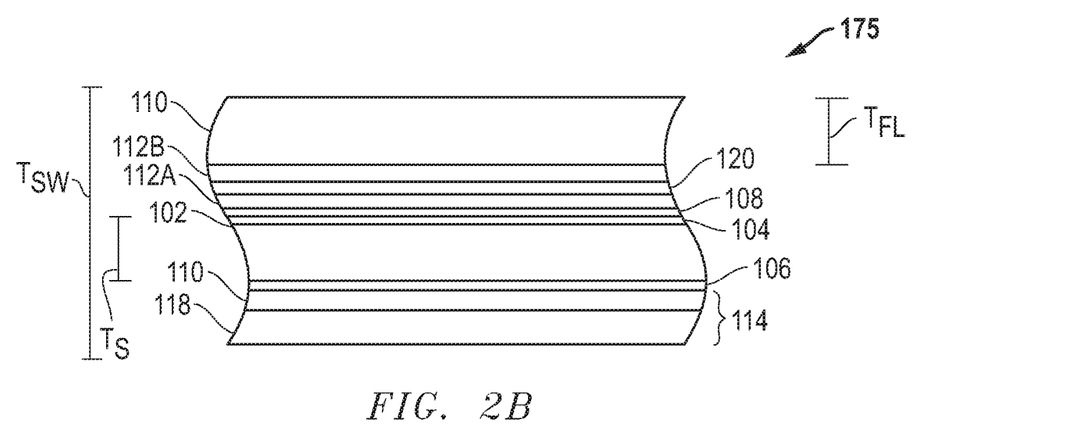
FIG. 2B is an illustration of the layer structure of a bearing according to a number of embodiments.

FIG. 2A shows a cross section illustrating the various layers of the bearing, generally designated 150. According to this particular embodiment, the bearing 150 may be similar to the bearing 100 of FIG. 1, except this bearing 150 may also include at least one corrosion protection layer 104, 106. The substrate layer 102 may be coated with temporary corrosion protection layers 104 and 106 to prevent corrosion of the substrate layer prior to processing. Additionally, temporary corrosion protection layer 108 can be applied over top of layer 104. Each of layers 104, 106, and 108 can have a thickness of between about 1 micron to about 50 microns, such as between about 7 microns and about 15 microns. Layers 104 and 106 can include a phosphate of zinc, iron, manganese, or any combination thereof. Additionally, the layers can be a nano-ceramic layer. Further, layers 104 and 106 can include functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Layer 108 can include functional silanes, nano-scaled silane based primers, hydrolysed silanes, organosilane adhesion promoters, solvent/water based silane primers. Temporary corrosion protection layers 104, 106, and 108 can be removed or retained during processing.

On an opposing surface of the substrate layer 102 from low friction material layer 110, a corrosion resistant coating 114 can be applied. The corrosion resistant coating 114 can have a thickness of between about 1 micron and about 50 microns, such as between about 5 microns and about 20 microns, such as between about 7 microns and 15 microns. The corrosion resistant coating 114 can include an adhesion promoter layer 116 and an epoxy layer 118. The adhesion promoter layer 116 can include a phosphate of zinc, iron, manganese, tin, or any combination thereof. Additionally, the adhesion promoter layer 116 can be nano-ceramic layer. The adhesion promoter layer 116 can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof.

The epoxy layer 118 can be a thermal cured epoxy, a UV cured epoxy, an IR cured epoxy, an electron beam cured epoxy, a radiation cured epoxy, or an air cured epoxy. Further, the epoxy resin can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy resin can include synthetic resin modified epoxies based on phenolic resins, urea resins, melamine resins, benzoguanamine with formaldehyde, or any combination thereof. By way of example, epoxies can include mono epoxoide, bis epoxide, linear tris epoxide, ramified tris epoxide, or any combination thereof, wherein $C_xH_yX_zA_U$ is a linear or ramified saturated or unsaturated carbon chain with optionally halogen atoms $X_z$ substituting hydrogen atoms, and optionally where atoms like nitrogen, phosphorous, boron, etc., are present and B is one of carbon, nitrogen, oxygen, phosphorous, boron, sulfur, etc.

The epoxy resin can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C=O—O—C=O—R' where R can be $C_xH_yX_zA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof. Generally, amines can be primary amines, secondary amines, or tertiary amines conforming to the formula $R_1R_2R_3N$ where R can be $C_xH_yX_zA_U$ as described above.

In an embodiment, the epoxy layer 118 can include fillers to improve the conductivity, such as carbon fillers, carbon fibers, carbon particles, graphite, metallic fillers such as bronze, aluminum, and other metals and their alloys, metal oxide fillers, metal coated carbon fillers, metal coated polymer fillers, or any combination thereof. The conductive fillers can allow current to pass through the epoxy coating and can increase the conductivity of the coated bearing as compared to a coated bearing without conductive fillers.

In an embodiment, an epoxy layer can increase the corrosion resistance of the bearing. For example, an epoxy layer, such as epoxy layer 118, can substantially prevent corrosive elements, such as water, salts, and the like, from contacting the substrate layer, thereby inhibiting chemical corrosion of the substrate layer. Additionally, the epoxy layer can inhibit galvanic corrosion of either the housing or the substrate layer by preventing contact between dissimilar metals. For example, placing an aluminum bearing without the epoxy layer within a magnesium housing can cause the magnesium to oxidize. However, an epoxy layer, such as epoxy layer 118, can prevent the aluminum substrate from contacting the magnesium housing and inhibit corrosion due to a galvanic reaction.

FIG. 2B shows a cross section illustrating the various layers of the bearing, generally designated 175. According to this particular embodiment, the bearing 175 may be similar to the bearing 100 of FIG. 2A, except this bearing 175 may also include a woven mesh or expanded metal grid 120 embedded between two adhesive layers 112A and 112B. In an embodiment, the low friction material layer 110 may include a woven mesh or an expanded metal grid. The woven mesh or expanded metal grid can include a metal or metal alloy such as aluminum, steel, stainless steel, bronze, or the like. Alternatively, the woven mesh can be a woven polymer mesh. In an alternate embodiment, the low friction material layer may not include a mesh or grid. In a number of embodiments, the substrate layer 102 may be encapsulated in the low friction material layer 110 by calendaring or laminating through the apertures in the sheet. The sheet may be formed into a substrate layer 102 having radial inner and outer surfaces. A low friction material layer 110 may encapsulate the substrate layer 102 such that at least one of the radial inner and outer surfaces of the substrate layer 102 may be located within the low friction material layer 110.

In a number of embodiments, as shown in FIGS. 1-2B, the bearing 100 can have a thickness, T, and T can be ≥0.1 mm, such as ≥0.25 mm, ≥0.5 mm, ≥1 mm, ≥1.5 mm, ≥2 mm, or ≤2.5 mm. In another aspect, T can be ≤2.0 mm, ≤1.5 mm, ≤1 mm, ≤0.5 mm, 0.25 mm, or ≤0.1 mm. It will be appreciated that the bearing 100 can have a thickness, T, which may be within a range between any of the minimum and maximum values noted above. It will be further appreciated that the bearing 100 can have a thickness, T, which may be any value between any of the minimum and maximum values noted above. For example, the bearing 100 can have a thickness, T that may be 0.5 mm.

Turning to the method of forming the bearing (generally designated 100 below, but could include any of the components of bearings 150, 175, above) the low friction material layer 110 can be glued to the substrate layer 102 using a melt adhesive 112 to form a laminate sheet. The laminate sheet can be cut into strips or blanks that can be formed into the bearing. Cutting the laminate sheet can create cut edges including an exposed portion of the substrate layer. The blanks can be formed into the bearing, 100, such as by rolling and flanging the laminate to form a semi-finished bearing of a desired shape.

Figure 3A:
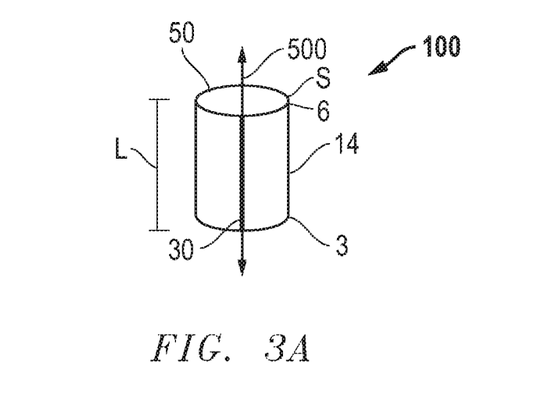
FIG. 3A is an illustration of a bearing according to a number of embodiments.
Figure 3B:
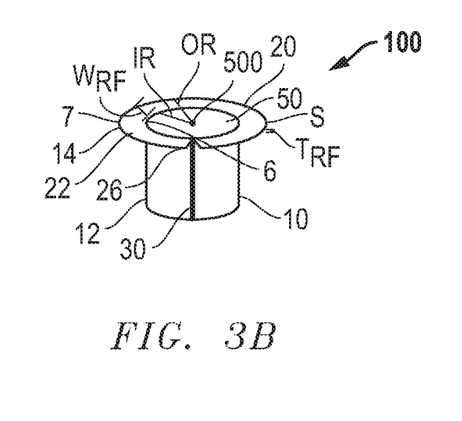
FIG. 3B is an illustration of a bearing according to a number of embodiments.
Figure 3C:
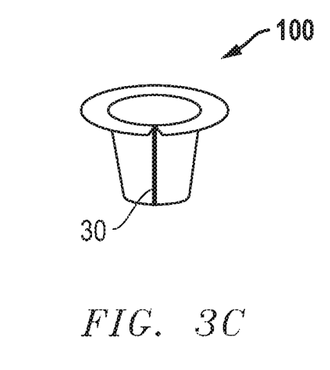
FIG. 3C is an illustration of a bearing according to a number of embodiments.
Figure 3D:
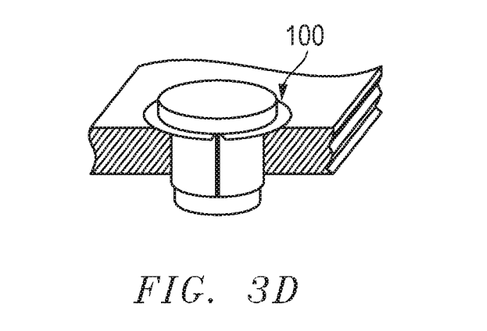
FIG. 3D is an illustration of a bearing according to a number of embodiments.
Figure 3E:
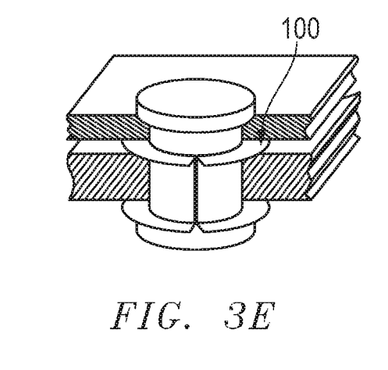
FIG. 3E is an illustration of a bearing according to a number of embodiments.
Figure 3F:
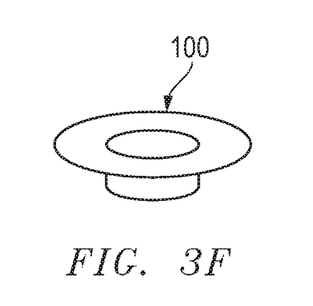
FIG. 3F is an illustration of a bearing according to a number of embodiments.

For purposes of illustration, FIGS. 3A through 3F illustrate a number of bearing 100 shapes that can be formed from the blanks. FIG. 3A illustrates a cylindrical bearing 100 that can be formed by rolling. FIG. 3B illustrates a flanged bearing 100 that can be formed by rolling and flanging. FIG. 3C illustrates a flanged bearing 100 having a tapered cylindrical portion that can be formed by rolling a tapered portion and flanging an end. FIG. 3D illustrates a flanged bearing 100 mounted in a housing with a shaft pin mounted through the flanged bearing 100. FIG. 3E illustrates a two-sided flanged bearing 100 mounted in a housing with a shaft pin mounted through the two-sided flanged bearing 100. FIG. 3F illustrates an L type bearing 100 that can be formed using a stamping and cold deep drawing process, rather than rolling and flanging.

Referring now to FIGS. 3A-3B, in a number of specific embodiments, the bearing may be a plain bearing 100. In a number of embodiments, the bearing 100 may be a sliding bearing. The bearing 100 may extend in the axial direction relative to a central axis 500. The central axis 500 may be longitudinal down the length of the bearing 100. The bearing 100 may include a sidewall 14 forming an annular shape having a first axial end or edge 3 and a second axial end or edge 5. The bearing may have an outer radial end or edge 7 and an inner radial end or edge 6. In a number of embodiments, the bearing 100 may have a non-planar shape. The bearing 100 may have an annular shape that is substantially L shaped. In other words, the bearing 100 may have an L bearing cross-section extending in the radial and axial direction as shown in FIG. 3B. Other annular shapes of the bearing are possible. In a number of embodiments, the bearing 100 shown in FIG. 3A may be produced by rolling of an appropriately dimensioned piece of bearing composite which may be initially present as flat material. The opposite ends of a rolled piece of material may be bound at an axial gap 30 that runs in the axial direction down the bearing sidewall 14. Axial gaps 30 running in any nonlinear fashion and/or obliquely to the axis 500 of symmetry of the bearing 100 are also possible. In a number of particular embodiments, the axial gap 30 may be welded or otherwise coupled by other means to form the bearing 100. In some embodiments, the axial gap 30 may be left uncoupled to ease assembly of the bearing 100. Still referring to FIG. 3A, the bearing 100 may include a bore 50. The bore 50 may run down the axial length of the bearing 100 and be adapted to couple to another component of an assembly. The bore 50 may be parallel or planar to the central axis 500. The bore 50 formation may comprise forming shaped holes in the sheet by perforating or stamping. The fabricating of geometrical formations into the sheet may be accomplished by coining, forming or deep drawing waves, balls or cones to form the sheet profile. In a number of embodiments, the L-shape bearing 100 may be achieved by a deep-drawing process involving stamping a formed bearing 100 (as shown in FIG. 3B).

Referring now to FIG. 3B, the bearing 100 may include a radial bearing portion 10. The radial bearing portion 10 may be in the form of an axially extending base region 12. The radial bearing portion 10 may extend from the first axial end 3 to the second axial end 5. The radial bearing portion 10 may be on the sidewall 14 of the bearing 100. The bearing 100 may further include an axial bearing portion 20. The axial bearing portion 20 may be on the sidewall 14 of the bearing 100. The axial gap 30 may run in the axial direction down the axial bearing portion 20. The axial bearing portion 20 may be in the form of a radial flange 22. The axial bearing portion 20 or radial flange 22 may extend from the central axis 500 at an outer radial end or edge 7. In a number of embodiments, the bore 50 may divide the axial bearing portion 20 in the radial direction by providing an inner radial end or edge 6 defining the edges of the bore 50 within the bearing 100. In a number of embodiments, the outer radial end 7 may form the outer radius OR of the bearing 100 when measured radially from the central axis 500. In a number of embodiments, the inner radial end 6 may form the inner radius IR of the bearing 100 when measured radially from the central axis 500. In other words, the radial width of the radial flange 22 $W_{RF}$ may be the distance from the difference in distance of the outer radius OR and the inner radius IR. In a number of embodiments, the radial flange 22 may include an axial split 26. The axial split 26 may provide a gap. In certain embodiments, the axial split 26 can include a radial flange 22 that is contiguous with the axial gap 30 in the sidewall 14.

In a number of embodiments, as shown in FIG. 3B, the radial flange 22 can have a thickness, $T_{RF}$, of between about 1 micron to about 3500 microns, such as between about 100 microns and about 2000 microns, such as between about 250 microns and about 1000 microns, such as between about 450 microns and about 800 microns. It will be appreciated that the radial flange 22 can have a thickness, $T_{RF}$, which may be within a range between any of the minimum and maximum values noted above. It will be further appreciated that the radial flange 22 can have a thickness, $T_{RF}$, which may be any value between any of the minimum and maximum values noted above.

In a number of embodiments, as shown in FIGS. 3A-3B, the bearing 100 may have an overall inner radius, IR, from the central axis 500 to the inner radial end 6, and IR can be ≥1 mm, such as ≥5 mm, ≥7.5 mm, ≥10 mm, ≥15 mm, or ≥20 mm. The inner radius IR can be ≤20 mm, such as ≤15 mm, ≤10 mm, ≤7.5 mm, ≤5 mm, or ≤1 mm. The inner radius IR may vary along the circumference of the bearing 100. In a number of embodiments, the bearing 100 can have an overall inner radius, IR, of between about 1 to 6 mm. It will be appreciated that the bearing 100 can have an overall inner radius, IR, which may be within a range between any of the minimum and maximum values noted above. It will be further appreciated that the bearing 100 can have an overall inner radius, IR, which may be any value between any of the minimum and maximum values noted above.

In a number of embodiments, as shown in FIGS. 3A-3B, the bearing 100 may have an overall outer radius, OR, from the central axis 500 to the outer radial end 7, and OR can be ≥0.5 mm, such as ≥1 mm, ≥5 mm, ≥10 mm, ≥15 mm, or ≥20 mm. The outer radius OR can be ≤35 mm, such as ≤30 mm, ≤20 mm, ≤15 mm, ≤10 mm, or ≤5 mm. The overall outer radius, OR, may vary along the circumference of the bearing 100. In a number of embodiments, the bearing 100 can have an overall outer radius, OR, of between about 3 mm to 15 mm. It will be appreciated that the bearing 100 can have an overall outer radius, OR, that may be within a range between any of the minimum and maximum values noted above. It will be further appreciated that the bearing 100 can have an overall outer radius, OR, that may be any value between any of the minimum and maximum values noted above. Further, as stated above, the radial width of the radial flange 22, $W_{RF}$, may be the distance from the difference in distance of the outer radius OR and the inner radius IR. In a number of embodiments, the radial width of the radial flange 22, $W_{RF}$, may between 1 mm and 10 mm.

In a number of embodiments, as shown in FIGS. 3A-3B, the bearing 100 can have an overall length, L, from first axial end 3 to the second axial end 5, and L can be ≥0.5 mm, ≥0.75 mm, ≥1 mm, ≥2 mm, ≥5 mm, or ≥10 mm. The length L can be ≤10 mm, such as ≤7.5 mm, ≤5 mm, ≤2.5 mm, or ≤1 mm. In a number of embodiments, the bearing 100 can have an overall length, L, of between about 5 to 50 mm. It will be appreciated that the bearing 100 can have an overall length, L, which may be within a range between any of the minimum and maximum values noted above. It will be further appreciated that the bearing 100 can have an overall length, L, which may be any value between any of the minimum and maximum values noted above.

Figure 4:
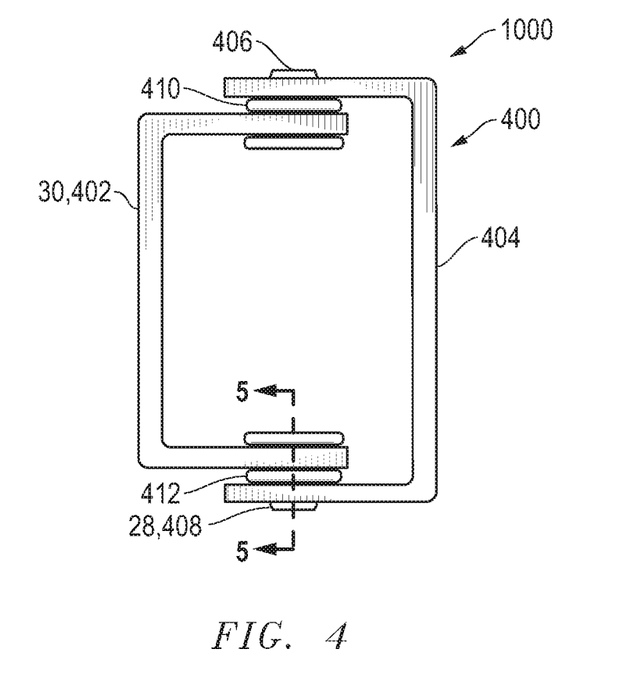
FIG. 4 is an illustration of a bearing within an assembly according to a number of embodiments.
Figure 5:
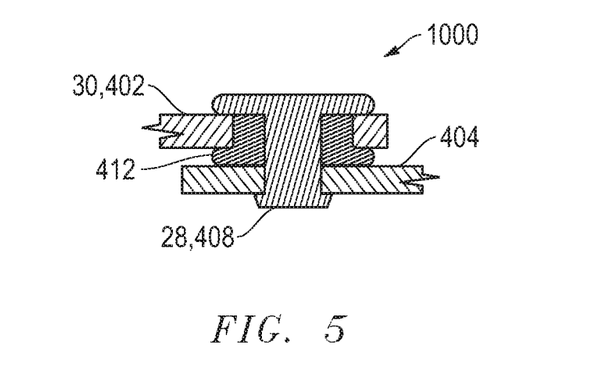
FIG. 5 is an illustration of a bearing within an assembly according to a number of embodiments.

In a number of embodiments, the bearing 100 may be including in an assembly 1000. The assembly 1000 may further include an inner member 28 and an outer member 30. In a number of embodiments, the bearing 100 may be disposed between the inner member 28 and the outer member 30. FIGS. 4 and 5 illustrate an assembly 1000 in the form of an exemplary hinge 400, such as an automotive door hinge, hood hinge, engine compartment hinge, and the like. Hinge 400 can include an inner member 28 (such as an inner hinge portion 402) and an outer hinge portion 404. Hinge portions 402 and 404 can be joined by outer members 30 (such as rivets 406 and 408) and bearings 410 and 412. Bearings 410 and 412 can be bearings of embodiments herein, as previously described and labeled 100 herein. FIG. 5 illustrates a cross section of hinge 400, showing rivet 408 and bearing 412 in more detail.

Figure 6:
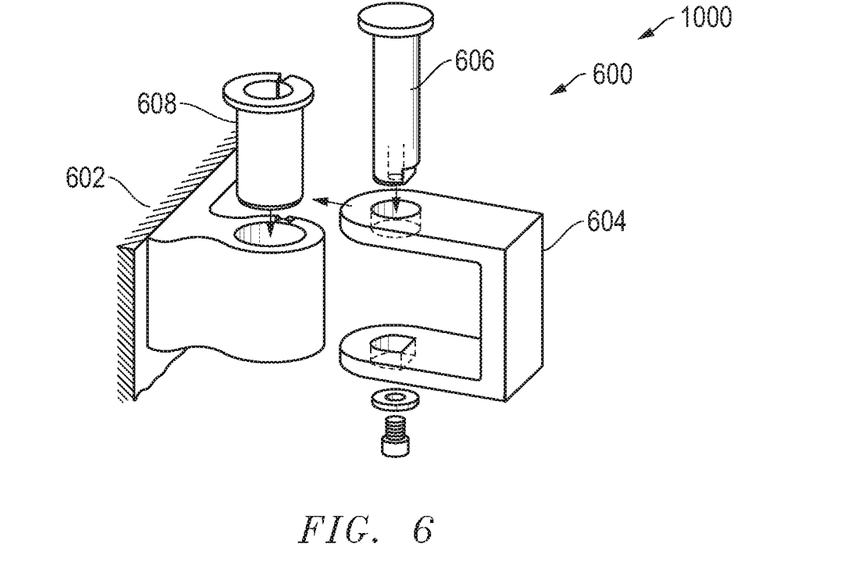
FIG. 6 is an illustration of a bearing within an assembly according to a number of embodiments.

FIG. 6 illustrates an assembly 1000 in the form of another exemplary hinge 600, such as an automotive door hinge, hood hinge, engine compartment hinge, and the like. Hinge 600 can include a first hinge portion 602 and a second hinge portion 604 joined by a pin 606 and a bearing 608. Bearing 608 can be a bearing as previously described.

Figure 7:
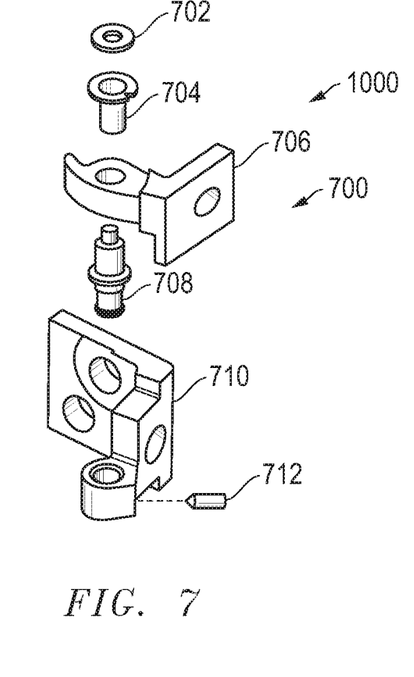
FIG. 7 is an illustration of a bearing within an assembly according to a number of embodiments.

In an exemplary embodiment, FIG. 7 depicts a non-limiting example of an assembly 1000 in the form of an embodiment of another hinge assembly 700 including the parts of a disassembled automobile door hinge including bearing 704. FIG. 7 is an example of a profile hinge. The bearing 700 may be inserted in hinge door part 706. Bearing 704 can be a bearing of embodiments herein, as previously described. Rivet 708 bridges the hinge door part 706 with hinge body part 710. Rivet 708 may be tightened with hinge body part 710 through set screw 712 and hold in place with the hinge door part 706 through washer 702.

Figure 8:
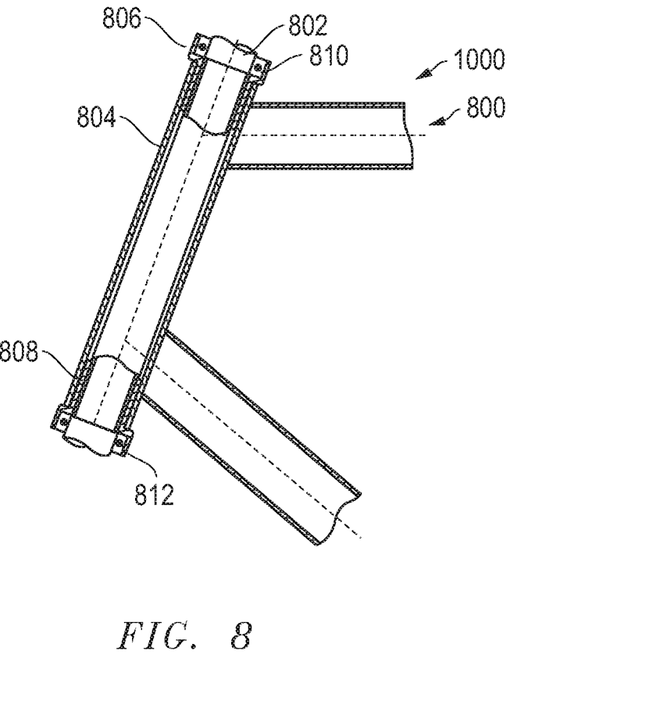
FIG. 8 is an illustration of a bearing within an assembly according to a number of embodiments.

FIG. 8 illustrates an assembly 1000 in the form of an exemplary headset assembly 800 for a two-wheeled vehicle, such as a bicycle or motorcycle. A steering tube 802 can be inserted through a head tube 804. Bearings 806 and 808 can be placed between the steering tube 802 and the head tube 804 to maintain alignment and prevent contact between the steering tube 802 and the head tube 804. Bearings 806 and 808 can be bearings of embodiments herein, as previously described. Additionally, seals 810 and 812 can prevent contamination of the sliding surface of the bearing by dirt and other particulate matter.

Such assemblies noted above are all exemplary and are not meant to limit the use of the bearing 100 in potential other assemblies. For example, the bearing 100 may be used in an assembly 1000 for a powertrain assembly application (such as belt tensioners) or other assembly applications with limited space.

In an embodiment, the bearing 100 can have a elongation at break, $A_{50}$, where $A_{50}$ can be at least 20, at least 35, at least 45, at least 50, or even at least 60. In a further embodiment, the bearing 100 can have an elongation at break, $A_{50}$, where $A_{50}$ can be of no greater than 75, such as no greater than 50, or no greater than 35. It will be appreciated that the elongation at break, $A_{50}$, may be within a range between any of the minimum and maximum values noted above. It will be further appreciated that the elongation at break, $A_{50}$, may be any value between any of the minimum and maximum values noted above. For example, the elongation at break, $A_{50}$, may be ≥23%.

In an embodiment, the bearing 100 can have a tensile strength, $R_m$, where $R_m$ can be at least 75 N/mm² or at least 100 N/mm². In a further embodiment, the bearing 100 can have a tensile strength, $R_m$, where $R_m$ can be no greater than 1,000 N/mm², such as no greater than 500 N/mm² or no greater than 250 N/mm². It will be appreciated that the tensile strength, $R_m$, may be within a range between any of the minimum and maximum values noted above. It will be further appreciated that the tensile strength, $R_m$, may be any value between any of the minimum and maximum values noted above. For example, the tensile strength, $R_m$, may be between 90 and 140 N/mm².

In an embodiment, the bearing 100 can have a yield point, $Y_p$, where $Y_p$ can be at least 25 N/mm², at least 50 N/mm², at least 75 N/mm², at least 100 N/mm², or even at least 150 N/mm². In a further embodiment, the bearing 100 can have a yield point, $Y_p$, where $Y_p$ can be of no greater than 500 N/mm², such as no greater than 250 N/mm², no greater than 100 N/mm², or no greater than 75 N/mm². It will be appreciated that the tensile strength, $R_m$, may be within a range between any of the minimum and maximum values noted above. It will be further appreciated that the tensile strength, $R_m$, may be any value between any of the minimum and maximum values noted above. For example, the yield point, $Y_p$, may be ≥35 N/mm².

Figure 9:
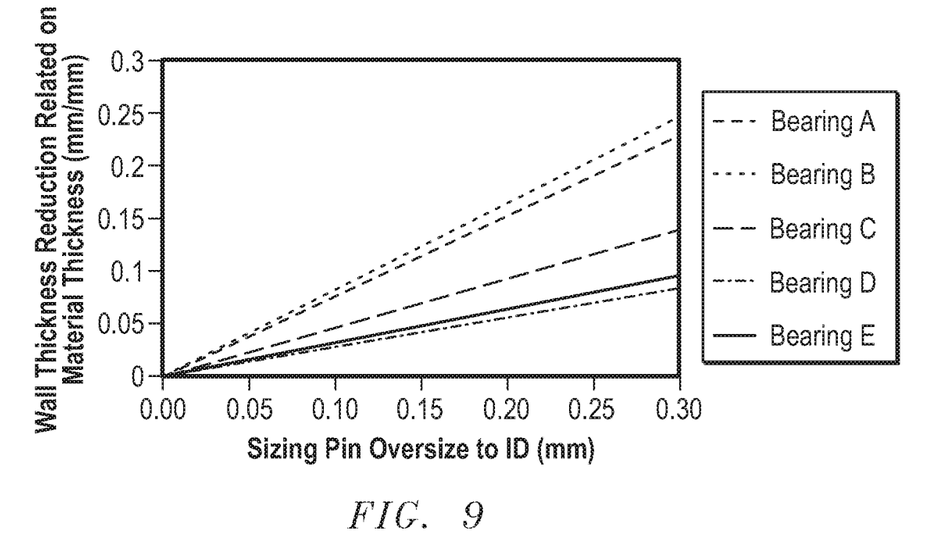
FIG. 9 is a graph of sizing pin oversize to inner diameter of the bearing versus wall thickness reduction related on material thickness of a bearing in comparison to existing prior art bearings according to a number of embodiments.

FIG. 9 illustrates a graph of sizing pin oversize to inner diameter of the bearing versus wall thickness reduction related on material thickness of a bearing in comparison to existing prior art bearings according to a number of embodiments. Bearing A is a bearing 100 according to embodiments shown herein. Bearing B is a bearing with a non-metal backing with a metal grid substrate embedded low friction layer including polytetrafluoroethylene according to embodiments, shown herein. Bearing C is a bearing with a metal grid substrate embedded with a low friction layer including polytetrafluoroethylene with a thickness of 0.7 mm according to known bearings. Bearing D is a bearing with a metal backing with a metal grid substrate embedded with a low friction layer including polytetrafluoroethylene with a thickness of 1 mm according to known bearings. Bearing E is a bearing with a structured steel substrate embedded with a low friction layer including polytetrafluoroethylene with a thickness of 0.5 mm according to known bearings. As shown, when a sizing pin is introduced against the bearing between an inner component 28 and an outer component 30 in an assembly 1000 the wall thickness reduction related on material thickness of the bearing A according to embodiments shown herein has a greater value than bearings C, D, and E. As shown, embodiments of bearing A exhibits stiffer behavior than non-metal backed bearing B but have a wall thickness reduction that is nearly as good as non-metal backed bearing B known in the art.

Figure 10:
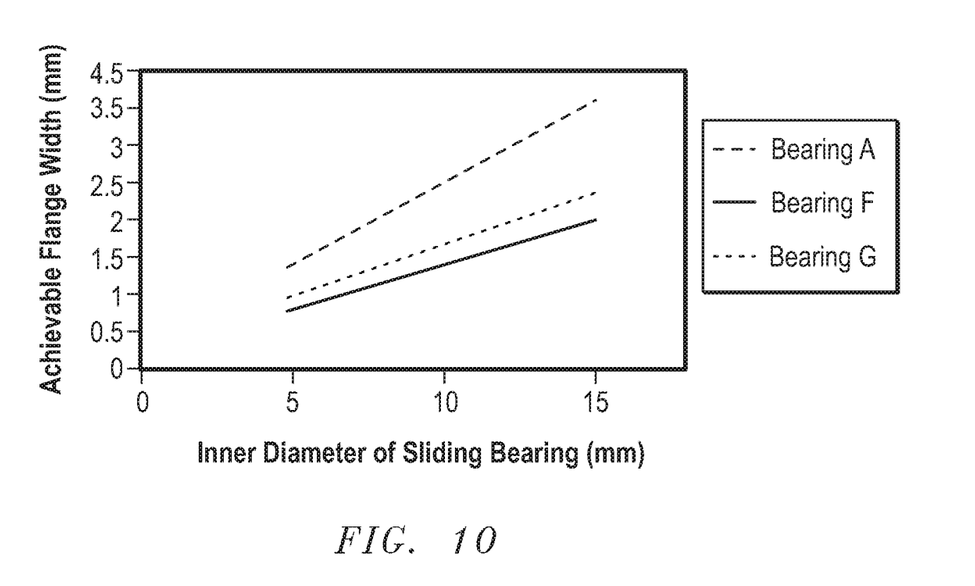
FIG. 10 is a graph of the inner diameter of the bearing versus achievable flange width of a bearing in comparison to existing prior art bearings according to a number of embodiments.

FIG. 10 illustrates a graph of the inner diameter of the bearing versus achievable flange width of a bearing in comparison to existing prior art bearings according to a number of embodiments. Bearing A is a bearing 100 with an aluminum 3003 alloy substrate with a low friction layer including polytetrafluoroethylene with a thickness of 0.5 mm according to embodiments shown herein. Bearing F is a bearing with an aluminum 3005 alloy substrate with a low friction layer including polytetrafluoroethylene with a thickness of 0.75 mm according to known bearings. Bearing G is a bearing with a with an aluminum 3003 alloy substrate with a low friction layer including polytetrafluoroethylene with a thickness of 1 mm according to known bearings. As shown, bearing A has a higher achievable flange width than bearings F and G known in the art due to higher elongation at break, $A_{50}$.

Applications for such embodiments include, for example, assemblies 1000 for hinges, other vehicle components, and other industrial types of application e.g. bikes, solar, etc. Further, use of the bearing 100 or assembly 1000 may provide increased benefits in several applications such as, but not limited to, vehicle tail gates, door frames, seat assemblies, powertrain applications (such as belt tensioners), or other types of applications. Various embodiments disclosed here can have significant advantages over conventional solutions. According to embodiments herein, bearings may exhibit higher corrosion resistance compared to existing bearings known in the art. Further, according to embodiments herein, the bearings may exhibit better flanging and exhibit stiffer behavior and/or improved wall thickness reduction compared to existing bearings known in the art. Further, according to embodiments herein, the bearings may provide improved wall thickness reduction under sizing compared to bearings known in the art.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A bearing comprising: a substrate layer comprising an aluminum alloy comprising a thickness, $T_S$, where $T_S \leq 0.6$ mm; an adhesive layer; and a low friction material layer overlying the adhesive layer, wherein the bearing comprises an elongation at break, $A_{50}$, of $\geq 23\%$.

Embodiment 2

An assembly including: an inner member; an outer member; and a bearing disposed between the inner member and the outer member, the bearing comprising: a substrate layer comprising an aluminum alloy comprising a thickness, $T_S$, where $T_S \leq 0.6$ mm; an adhesive layer; and a low friction material layer overlying the adhesive layer, wherein the bearing comprises an elongation at break, $A_{50}$, of $\geq 23\%$.

Embodiment 3

The bearing or assembly of any of the preceding embodiments, wherein the substrate layer comprises an aluminum alloy comprising: 96.8-99 wt % aluminum, 0.05 to 0.20 wt % copper, 0-0.70 wt % iron, 1 to 1.5 wt % manganese, 0-0.6 wt % silicon, and 0-0.1 wt % zinc.

Embodiment 4

The bearing or assembly of any of the preceding embodiments, wherein the bearing comprises a tensile strength, $R_m$, where $R_m$ has a value of between about 90 N/mm² to about 140 N/mm².

Embodiment 5

The bearing or assembly of any of the preceding embodiments, wherein the bearing comprises a yield point, $Y_p$, where $Y_p$ has a value of $\geq 35$ N/mm².

Embodiment 6

The bearing or assembly of any of the preceding embodiments, wherein the bearing comprises an axial bearing portion and a radial flange.

Embodiment 7

The bearing or assembly of embodiment 6, wherein the radial flange has a thickness of less than 0.75 mm.

Embodiment 8

The bearing or assembly of any of the preceding embodiments, wherein the adhesive layer is disposed between the substrate and the low friction material layer.

Embodiment 9

The bearing or assembly of embodiment 8, wherein the adhesive layer has a thickness of between 0.02 mm and 0.1 mm.

Embodiment 10

The bearing or assembly of embodiment 8, wherein the adhesive layer comprises a fluoropolymer.

Embodiment 11

The bearing or assembly of any of the preceding embodiments, wherein the substrate layer has a thickness of between 0.1 mm and 0.5 mm.

Embodiment 12

The bearing or assembly of any of the preceding embodiments, wherein the low friction layer has a thickness of between 0.05 mm and 0.25 mm.

Embodiment 13

The bearing or assembly of any of the preceding embodiments, wherein the substrate comprises aluminum 3003 alloy.

Embodiment 14

The bearing or assembly of any of the preceding embodiments, wherein the low friction material layer comprises a fluoropolymer.

Embodiment 15

The bearing of any of the preceding embodiments, wherein the low friction material layer comprises polytetrafluoroethylene.

Embodiment 16

The bearing or assembly of embodiment 6, wherein the radial flange comprising an axial split.

Embodiment 17

The bearing or assembly of embodiment 6, wherein bearing comprises an axial gap in the axial bearing portion.

Embodiment 18

The bearing or assembly of any of the preceding embodiments, wherein bearing has an inner radius of 2.5-20 mm.

Embodiment 19

The bearing or assembly of any of the preceding embodiments, wherein bearing has an outer diameter of 5-25 mm.

Embodiment 20

The bearing or assembly of any of the preceding embodiments, wherein bearing has a length of 5-50 mm.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A bearing comprising:
    a substrate layer;
    an adhesive layer; and
    a low friction material layer overlying the adhesive layer, wherein the bearing comprises an elongation at break of≥23%, wherein the substrate layer comprises an aluminum alloy comprising:
    96.8-99 wt % aluminum,
    0.05 to 0.20 wt % copper,
    0-0.70 wt % iron,
    1 to 1.5 wt % manganese,
    0-0.6 wt % silicon, and
    0-0.1 wt % zinc, wherein the bearing has a thickness of greater than or equal to 0.1 mm and less than 0.5 mm, wherein the bearing comprises an axial bearing portion and radial flange.

2. The bearing off claim 1, wherein the bearing comprises a tensile strength having a value of between about 90 N/mm$^2$ to about 140 N/mm$^2$.

3. The bearing of claim 1, wherein the bearing comprises a yield point having a value of≥35 N/mm$^2$.

4. The bearing of claim 1, wherein the adhesive layer is disposed between the substrate and the low friction material layer.

5. The bearing of claim 4, wherein the adhesive layer has a thickness of between 0.02 mm and 0.1 mm.

6. The bearing of claim 4, wherein the adhesive layer comprises a fluoropolymer.

7. The bearing of claim 1, wherein the low friction layer has a thickness of between 0.05 mm and 0.25 mm.

8. The bearing of claim 1, wherein the substrate layer has a thickness between about 350 microns and 450 microns.

9. The bearing of claim 1, wherein the low friction material layer comprises a fluoropolymer.

10. The bearing of claim 1, wherein the low friction material layer comprises polytetrafluoroethylene.

11. The bearing of claim 1, wherein the radial flange comprising an axial split.

12. The bearing of claim 1, wherein bearing comprises an axial gap in the axial bearing portion.

13. The bearing of claim 1, wherein bearing has an inner radius of 2.5-20 mm.

14. The bearing of claim 1, wherein bearing has an outer diameter of 5-25 mm.

15. The bearing of claim 1, wherein bearing has a length of 5-50 mm.

* * * * *

UNITED STATES PATENT AND TRADEMARK OFFICE
CERTIFICATE OF CORRECTION

| | | |
|---|---|---|
| PATENT NO. | : 11,841,049 B2 | Page 1 of 1 |
| APPLICATION NO. | : 16/827797 | |
| DATED | : December 12, 2023 | |
| INVENTOR(S) | : Hans-Juergen Jaeger et al. | |

It is certified that error appears in the above-identified patent and that said Letters Patent is hereby corrected as shown below:

In the Claims

Column 14, Line 9, please delete "and radial", and insert --and a radial--

Signed and Sealed this
Thirteenth Day of January, 2026

John A. Squires
*Director of the United States Patent and Trademark Office*